US007616946B2

(12) United States Patent
Park et al.

(10) Patent No.: US 7,616,946 B2
(45) Date of Patent: Nov. 10, 2009

(54) MOBILE TERMINAL HAVING BOOKMARK FUNCTIONN OF CONTENTS SERVICE AND OPERATION METHOD THEREOF

(75) Inventors: Sung-Jun Park, Seoul (KR); Hye-Mi Park, Seoul (KR)

(73) Assignee: LG Electronics Inc., Seoul (KR)

( * ) Notice: Subject to any disclaimer, the term of this patent is extended or adjusted under 35 U.S.C. 154(b) by 522 days.

(21) Appl. No.: 11/490,159

(22) Filed: Jul. 21, 2006

(65) Prior Publication Data

US 2007/0027949 A1 Feb. 1, 2007

(30) Foreign Application Priority Data

Jul. 21, 2005 (KR) ...................... 10-2005-0066396

(51) Int. Cl.
*H04M 3/42* (2006.01)

(52) U.S. Cl. .................. 455/414.1; 455/414.3; 709/219

(58) Field of Classification Search .............. 455/456.2, 455/414.2; 370/351; 709/219
See application file for complete search history.

(56) References Cited

U.S. PATENT DOCUMENTS 6,868,225 B1 * 3/2005 Brown et al. .................. 386/83
7,013,130 B2 * 3/2006 Ku .......................... 455/414.2
7,143,353 B2 * 11/2006 McGee et al. ............... 715/723
7,159,233 B2 * 1/2007 Son et al. ....................... 725/86
7,299,267 B1 * 11/2007 Pedersen et al. ............ 709/217
7,376,330 B2 * 5/2008 Oura et al. ..................... 386/33
2002/0069218 A1 * 6/2002 Sull et al. ................ 707/501.1
2002/0163532 A1 * 11/2002 Thomas et al. .............. 345/723

FOREIGN PATENT DOCUMENTS

KR 10-2004-0041082 A 5/2004
KR 10-2005-0046449 A 5/2005

* cited by examiner

*Primary Examiner*—Lester Kincaid
*Assistant Examiner*—Isaak R Jama
(74) *Attorney, Agent, or Firm*—Birch, Stewart, Kolasch & Birch, LLP

(57) ABSTRACT

A mobile terminal having a bookmark function for a contents service include a controller for bookmarking a particular time point of currently reproduced contents, a storage unit for storing information on the bookmarked particular time point of the contents, and a reproducing unit for reproducing the contents starting from the particular time point based on the stored particular time point information.

14 Claims, 4 Drawing Sheets

Start
S21 Bookmarking particular time point of reproduced contents
S22 Storing information on the bookmarked particular time point
S23 Reproducing contents starting from a time point following the particular time point based on the information
End

FIG. 4

Bookmark

| Name | Memo |
| --- | --- |
| 1. "Movie1" from 20mins | . Running time 2H |
| 2. "Movie2" from 50mins | . |
| 3. English lecture Ch. 4 | . Listening course |
| 4. "Show1" from 1H | . Casting "xxx/xxx" |

MOBILE TERMINAL HAVING BOOKMARK FUNCTIONN OF CONTENTS SERVICE AND OPERATION METHOD THEREOF

This application claims priority to Korean Patent Application No. 10-2005-0066396 filed on Jul. 21, 2006 in Korea, the entire contents of which are hereby incorporated by reference in their entity.

BACKGROUND OF THE INVENTION

1. Field of the Invention

The present invention relates to a mobile terminal and, more particularly, to a contents service of a mobile terminal.

2. Description of the Related Art

Mobile terminals have evolved to provide functions of storing and reproducing video data as well as providing basic voice call functions. In addition, currently, mobile terminals allow wireless connectivity and Internet access, so mobile terminal users can receive diverse contents services. General contents include movies, animation, music files, and applications such as a clipboard function. In general, the contents are included in a video file, an audio file or an application file and transmitted as such from a contents providing server to mobile terminals in a streaming service, so that the mobile terminal users can use the contents service. In this case, the mobile terminal users are to pay the wireless access (or connectivity) usage fee and the contents usage fee.

In related art mobile terminals, when a user temporarily suspends the use of a contents service and then later resumes it, the suspended contents service is re-started from the beginning of the service. That is, in the related art contents service providing method, if the user stops using of a contents service for some reasons and then resumes the suspended contents service at a later time, the user must begin the suspended contents from its starting point.

In addition, in the related art contents service providing method using the related art mobile terminal, although the user wants to receive only a particular portion of the contents which have been provided before, the user cannot receive the particular portion of the contents, but instead, receives the contents service from the start and the user must then search for the particular portion of the contents.

Consequently, the user should pay for higher expenses incurred in wireless connectivity, access fees, and the like, because of the contents service is undesirably received again from its beginning. Thus, it would be advantageous to minimize the waste of time and money caused to the user.

BRIEF DESCRIPTION OF THE INVENTION

One aspect of the present invention is that the present inventors recognized the problems and disadvantages of the related art described above. Based upon such recognition, the features of the present invention have been developed.

One exemplary feature of the present invention is to provide a method and apparatus related to a bookmark function for a streaming type contents service (or other similar function for indicating a particular location, place or spot within a contents service), which allows a user of a mobile terminal to immediately receive a contents service from a desired portion (instead of receiving the contents services from its beginning).

Another exemplary feature of the present invention is to provide a mobile terminal and its operation method supporting a bookmark function for a contents service that allows users to minimize costs (access fees, contents usage fees, etc.) because the contents service can be reproduced from the time point (location) indicated by the bookmark, instead of having to reproduce the contents service from its beginning (start) point.

Still another exemplary feature of the present invention is to provide a mobile terminal having a bookmark function for a contents service capable of saving time otherwise wasted for reproducing unnecessary contents by applying a bookmark function to a contents service provided according to a streaming method, and its operation method.

To implement at least the above feature in whole or in parts, the present invention provides a mobile terminal having a bookmark function for a contents service including: a controller for bookmarking a particular time point of currently reproduced contents; a storage unit for storing information on the bookmarked particular time point of the contents; and a reproducing unit for reproducing the contents starting from the particular time point based on the stored particular time point information.

To implement at least the above feature in whole or in parts, the present invention also provides a method for operating a mobile terminal having a bookmark function of a contents service including: bookmarking a particular time point of currently reproduced contents; storing information on the bookmarked particular time point of the contents; and reproducing the contents starting from the particular time point based on the stored particular time point information.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 4 shows an example of a bookmark list of the mobile terminal having a bookmark function for a contents service.

DETAILED DESCRIPTION OF THE INVENTION

A mobile terminal having a bookmark function for a contents service capable of increasing user convenience, saving a contents usage fee and a wireless internet usage fee, and also saving time by applying a bookmark function to a contents service provided according to a streaming method, and its operation method according to exemplary embodiments of the present invention will be described with reference to the accompanying drawings.

Here, non-limiting examples of a mobile station may include a cell phone, PDA, laptop computer, etc., and non-limiting examples of a contents service may include the providing of video clips, movies, etc., and the bookmark function of the present invention can refer to any type of indication (preferably, a time point or frame indicator) that can be made for a particular portion of the content being provided by the contents service. Such bookmark (or indicator) can later be referred to when resuming reproduction of the content after a temporary pause.

In describing the present invention, if a detailed explanation for a related known function or structure is considered to unnecessarily divert the gist of the present invention, such explanation has been omitted but would be understood by those skilled in the art.

Figure 1:
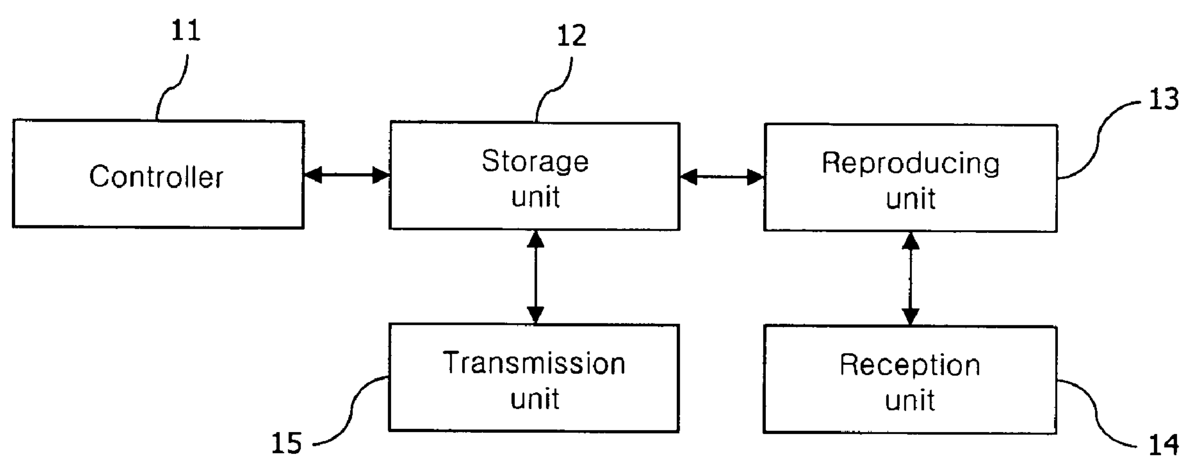
FIG. 1 is a schematic block diagram showing the structure of a mobile terminal having a bookmark function for a contents service according to the present invention.

FIG. 1 is a schematic block diagram showing the construction (structure) of a mobile terminal having a bookmark function for a contents service according to the present invention.

As shown in FIG. 1, a mobile terminal having a bookmark function for a contents service according to the present invention may include: a controller 11 for bookmarking (or otherwise indicating) a particular time point (e.g., reproduction time, frame number, etc.) of currently reproduced contents (e.g., a movie, video, etc.); a storage unit 12 for storing information on the bookmarked particular time point of the contents; and a reproducing unit 13 for reproducing the contents starting from the particular time point based on the stored particular time point information. The mobile terminal may additionally include a transmission unit 15 for providing the storage of particular time point information to a contents providing server; and a reception unit 14 for receiving contents data starting from the particular time point from the contents providing server based on the storage particular time point information.

The operation of the mobile terminal having the bookmark function for a contents service according to the present invention will now be described in more detail with reference to FIG. 2.

Figure 2:
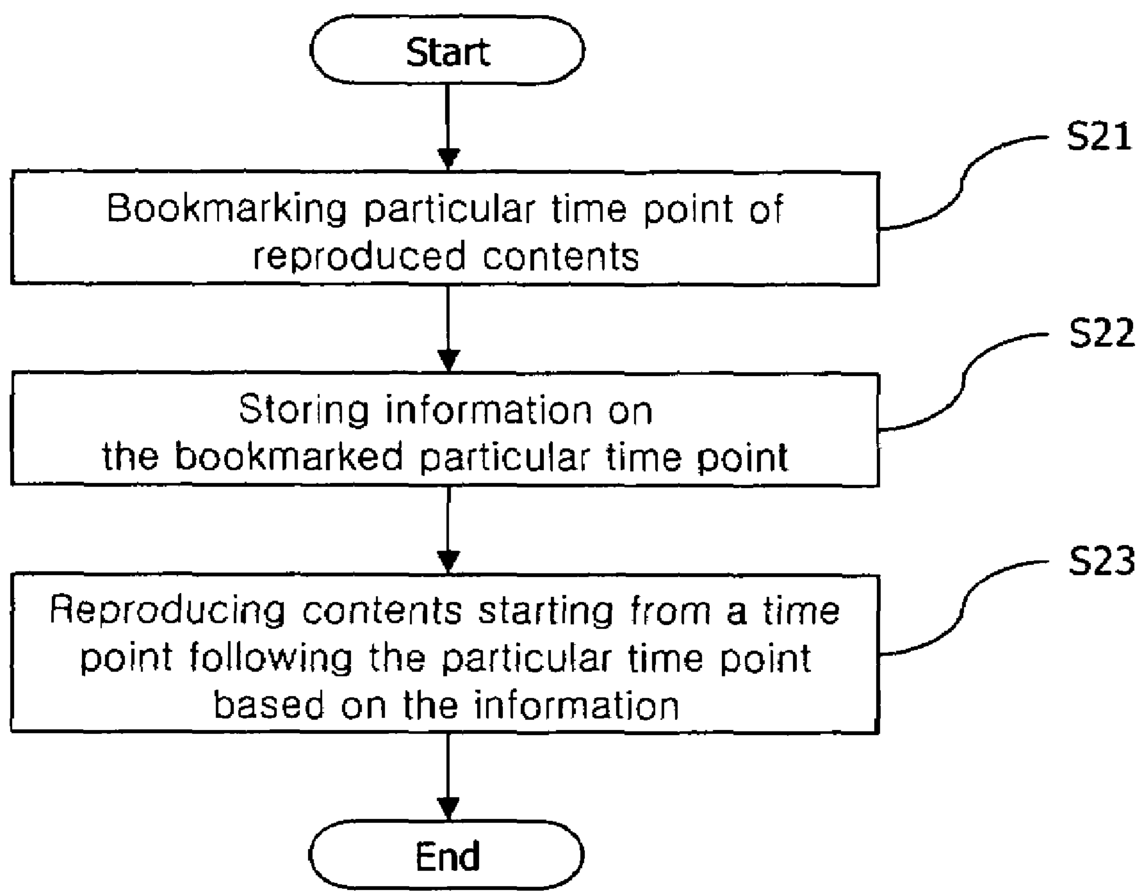
FIG. 2 is a flow chart illustrating the processes of a method for operating a mobile terminal having a bookmark function for a contents service.

FIG. 2 is a flow chart illustrating the processes of an exemplary method for operating a mobile terminal having a bookmark function for a contents service.

As shown in FIG. 2, an exemplary method for operating a mobile terminal having a bookmark function for a contents service according to the present invention may include: bookmarking a particular time point of currently reproduced contents (step S21); storing information on the bookmarked particular time point of the contents (step S22); and reproducing the contents starting from the particular time point based on the stored information on the particular time point (step S23). Herein, the method for operating the mobile terminal having the bookmark function for contents service may additionally include transmitting the stored information on the particular time point to a contents providing server; receiving the contents starting from the particular time point based on the stored information on the particular time point from the contents providing server; and generating a bookmark list based on a plurality of stored information on the particular time points of the contents and displaying it.

The method for operating the mobile terminal having the bookmark function for a contents service according to the present invention will be described in more detail as follows.

The controller 11 (implemented in hardware, software, or both) bookmarks (or otherwise indicates) a particular time point of the currently reproduced contents. The controller 11 may bookmark the particular time point of the contents according to a (bookmark) input signal received from a user. Alternatively, when the contents service is suddenly stopped, the controller 11 may detect this stoppage and automatically set the stopped moment as a particular time point and bookmark it. The controller 11 may be activated via an input button on a keypad or other portion of the mobile terminal.

The storage unit 12 can store the information on the bookmarked particular time point. Herein, the information on the particular time point may include a time indication during which the bookmarked contents was reproduced, a bookmarked frame (e.g., a key frame) of the bookmarked contents, a frame (e.g., a start frame) from which the bookmarked contents starts to be reproduced, a URL (Uniform Resource Locator) at which the bookmarked contents are provided, and authentication information of the mobile terminal which has received the bookmarked contents service, etc. In this case, when the bookmarked particular time point corresponds to a P-frame of the streamed contents data, the mobile terminal can use the I-frame that is the immediately previous frame of that P-frame as a start frame or can use the I-frame that is the closest frame to that P-frame as the start frame.

This will be described with reference to FIG. 3 as an example, as follows.

Figure 3:
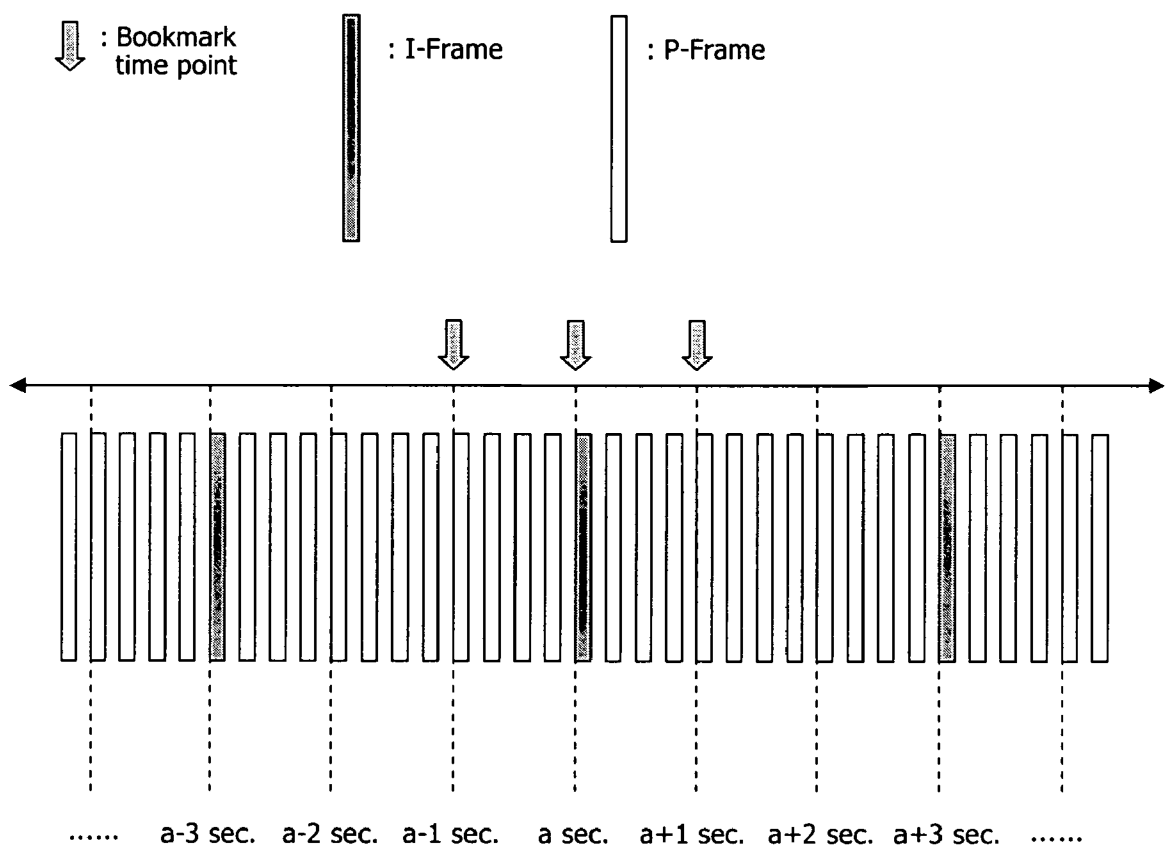
FIG. 3 shows a relationship between a bookmark time point and a start time point in a mobile terminal having a bookmark function for a contents service according to the present invention.

FIG. 3 shows a relationship between a bookmark time point and a start time point in a mobile terminal having a bookmark function for a contents service according to the present invention. It is assumed that contents of 4 fps (frame per seconds) have been streamed.

When a time point that is bookmarked by the user via the controller 11 is an I-frame ('a' seconds), the 'a' seconds frame is stored as a key frame and the storage unit 12 sets and stores the 'a' seconds frame as the start frame. If a time point bookmarked through the controller 11 by the user is a P-frame ('a−1' seconds), the 'a−1' seconds is stored as the key frame and the storage unit 12 may set and store the 'a' seconds frame, the closest frame of the P-frame, as the start frame or may set and store the I-frame, the immediately previous frame of the P-frame, as the start frame. In the same manner, when a bookmarked time point is the P-frame (a+1 seconds), the storage unit 12 sets and stress 'a' seconds frame as the start frame.

The storage unit 12 can store a plurality of particular information of the contents. In this case, a bookmark list (or other type of listing or menu) may be generated to allow better management of the stored particular information of the contents.

The bookmark list will be described in detail with reference to FIG. 4.

FIG. 4 shows an example of a bookmark list of the mobile terminal having a bookmark function for a contents service.

As shown in FIG. 4, the bookmark list may include four items including the particular information of the bookmarked contents. Herein, each item of the bookmark list may include a name and a memo. The user can edit the bookmark list. Namely, the user may delete each item of the bookmark list, change the name of each item of the bookmark list, or change the memo of each item of the bookmark list. Herein, the bookmark list can be modified to various forms without being limited to the form as shown in FIG. 3.

Thereafter, when the user of the mobile terminal having the bookmark function for a contents service wants to use the bookmarked contents service, the user can execute the function and select his/her desired item from the bookmark list.

Then, the transmission unit 15 may transmit particular information regarding the selected item to a contents providing server (not shown) or another appropriate entity in a network.

The contents providing server receives the particular information corresponding to the selected item from the transmission unit 15 and transmits data frames of the contents starting from the particular time point (start frame) based on the received particular time point information to the mobile terminal. For example, if the particular time point information is information on the fact that, for example, a particular movie was bookmarked at a time point of 20 minutes, the contents providing server transmits to the mobile terminal, data frames starting from the portion (the moment) following the 20 minutes.

Then, the reception unit 14 receives the contents data starting from the particular time point (start frame) based on the particular information corresponding to the selected item from the contents providing server (not shown). Namely, the reception unit 14 receives the data frames starting from the portion (the moment) following 20 minutes of the particular movie from the contents providing server.

Then, the reproducing unit 13 can reproduce the contents starting from the particular time point based on the received frames. Namely, the reproducing unit 13 reproduces the movie, whose former portions equivalent to 20 minutes has lapsed, based on the received data frames following the former 20 minutes.

The mobile terminal having the bookmark function for a contents service may be wirelessly connected to the Internet through a WAP browser (or other browsing interface) to receive the contents service from the contents providing server through an application program (such as a VOD player), or directly receive the contents service from the contents providing server through the application program such as the VOD player without executing the WAP browser.

The afore-mentioned contents may refer to audio files, video files or application files reproduced after being streamed via a wireless network, but the present invention is not limited thereto, and the contents can also include data, namely, audio files, video files or application files stored in the mobile terminal of the user.

Thus, when the contents is a data file stored in the mobile terminal of the user, the mobile terminal does not provide bookmarked particular information of the contents to the contents providing server, but instead, reads corresponding data from the data file stored in its internal memory and reproduces it.

As so far described, the mobile terminal having the bookmark function for a contents service and its operation method according to the present invention have many advantages.

That is, for example, by applying the bookmark function to the contents service provided according to the streaming method, the user can directly receive his/her desired contents service. Namely, user convenience can be enhanced.

In addition, by applying the bookmark function to the contents service provided according to the streaming method, a contents usage fee and a wireless internet usage fee that are to be paid for contents as they are otherwise unnecessarily reproduced can be saved.

Moreover, by applying the bookmark function to the contents service provided according to the streaming method, a time required for reproducing unnecessary contents can be saved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile terminal comprising:

a wireless module configured to access the Internet to receive moving image contents;

a display configured to display the received moving image contents in a web browser;

a controller configured to bookmark a particular time point of currently displayed moving image contents and to close the web browser such that moving image contents are not displayed;

a storage unit configured to store information on the bookmarked particular time point of the displayed moving image contents;

said display further configured to display a selectable item that can be selected to reproduce the moving image contents starting from the bookmarked particular time point; and a reproducing unit configured to reproduce the moving image contents starting from the bookmarked particular time point based on the stored particular time point information when the selectable item is selected without again executing the web browser, such that a user of the mobile terminal can view the moving image contents on the mobile terminal at the bookmarked particular time point without again executing the web browser, wherein the stored information on the bookmarked particular time point of the moving image contents includes a time during which the moving image contents being reproduced when bookmarked and frame information from which the moving image contents is to be reproduced.

2. The terminal of claim 1, wherein the storage unit is further configured to store data relating to reproducing the moving image contents.

3. The terminal of claim 1, wherein the frame information includes a start frame from which the moving image contents is to be reproduced.

4. The terminal of claim 3, wherein when the bookmarked particular time point corresponds to a P-frame of streamed data corresponding to the received moving image contents, the start frame is an I-frame previous to the P-frame.

5. The terminal of claim 3, wherein when the bookmarked particular time point corresponds to the P-frame of streamed data corresponding to the received moving image contents, the start frame is the I-frame closest to the P-frame.

6. The terminal of claim 1, further comprising:

an input unit configured to receive a bookmark input signal from the user, wherein the controller is further configured to bookmark the particular time point of the moving image contents according to the bookmark input signal from the user.

7. The terminal of claim 1, wherein if the currently reproduced moving image contents are suddenly stopped, the controller is further configured to automatically bookmark a time point at which the reproduced moving image contents are suddenly stopped as the particular time point.

8. A method of controlling a mobile, the method comprising:

accessing the Internet to receive moving image contents;

displaying, on a display of the mobile terminal, the received moving image contents in a web browser;

bookmarking, via a control unit of the mobile terminal, a particular time point of currently displayed moving image contents and closing the web browser such that the moving image contents are not displayed;

storing information on the bookmarked particular time point of the displayed moving image contents;

displaying a selectable item that can be selected to reproduce the moving image contents starting from the bookmarked particular time point; and reproducing, via a reproducing unit of the mobile terminal, the moving image contents starting from the bookmarked particular time point based on the stored particular time point information when the selectable item is selected without again executing the web browser, such that a user of the mobile terminal can view the moving image contents on the mobile terminal at the bookmarked particular time point without again executing the web browser, wherein the stored information on the bookmarked particular time point of the moving image contents includes a time during which the moving image contents being reproduced when bookmarked and frame information from which the moving image contents is to be reproduced.

9. The method of claim 8, wherein the storing step further comprises:

storing data relating to reproducing the moving image contents.

10. The method of claim 8, wherein the frame information includes a time during which the moving image contents were reproduced and a start frame from which the moving image contents is to be reproduced.

11. The method of claim 10, wherein when the bookmarked particular time point corresponds to a P-frame of streamed data corresponding to the received moving image contents, the start frame is an I-frame previous to the P-frame.

12. The method of claim 10, wherein when the bookmarked particular time point corresponds to the P-frame of streamed data corresponding to the received moving image contents, the start frame is the I-frame closest to the P-frame.

13. The method of claim 8, further comprising:

receiving a bookmark input signal from the user, wherein the bookmarking step bookmarks the particular time point of the moving image contents according to the bookmark input signal from the user.

14. The method of claim 8, wherein if the currently reproduced moving image contents are suddenly stopped, the bookmarking step automatically bookmark a time point at which the reproduced moving image contents are suddenly stopped as the particular time point.

* * * * *